Dec. 13, 1966    W. G. BUHLER    3,292,046
POWDER SPRAYER WITH FLEXIBLE BLADES
Filed April 23, 1964    6 Sheets-Sheet 2
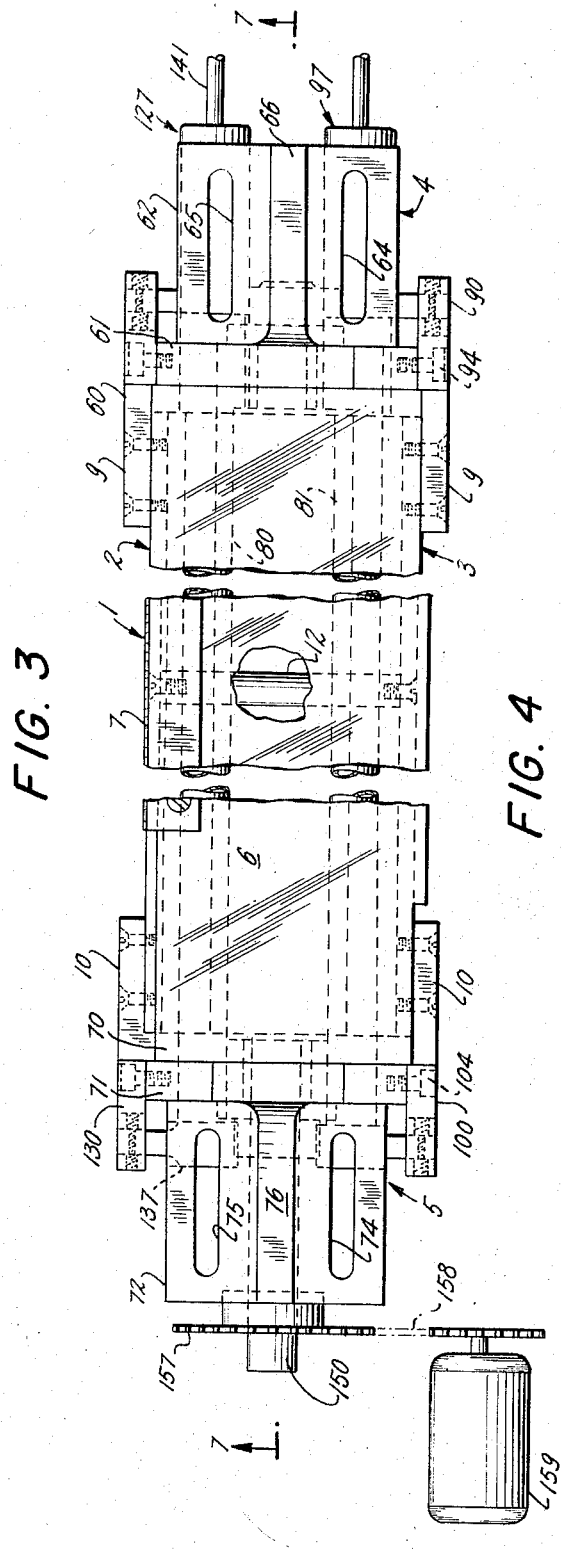
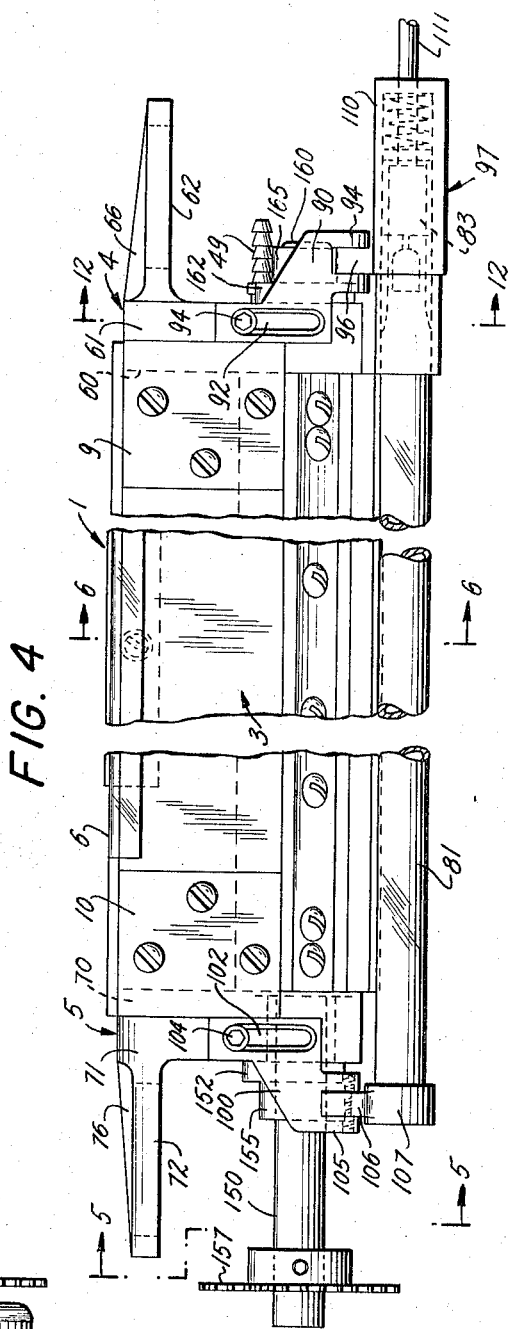
INVENTOR.
WARREN G. BUHLER
BY
Morgan, Finnegan, Durham & Pine
ATTORNEYS INVENTOR.
WARREN G. BUHLER
BY
Morgan, Finnegan, Durham & Pine
ATTORNEYS

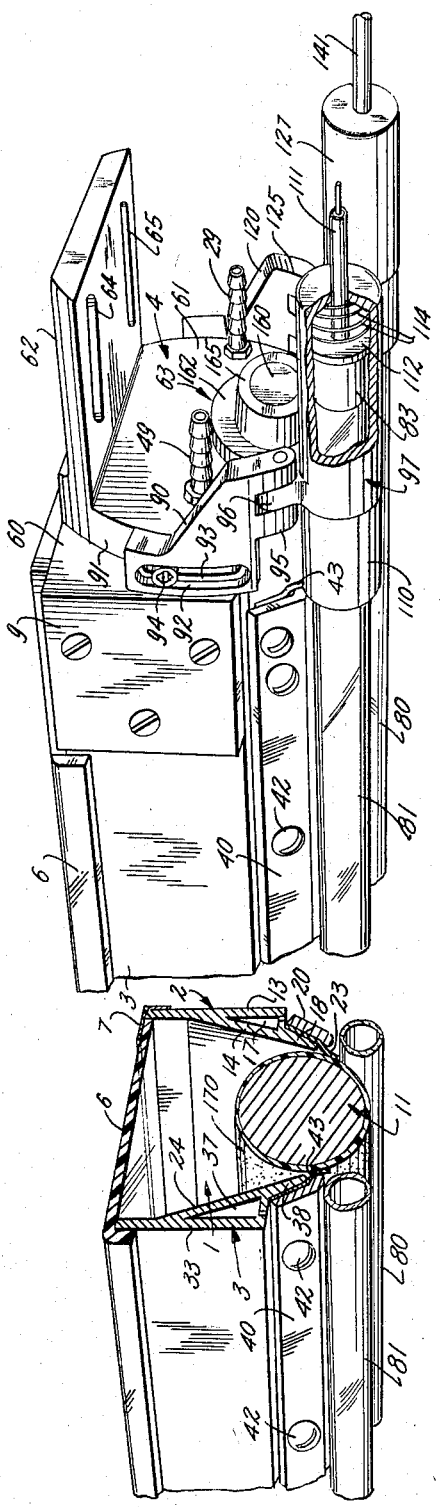

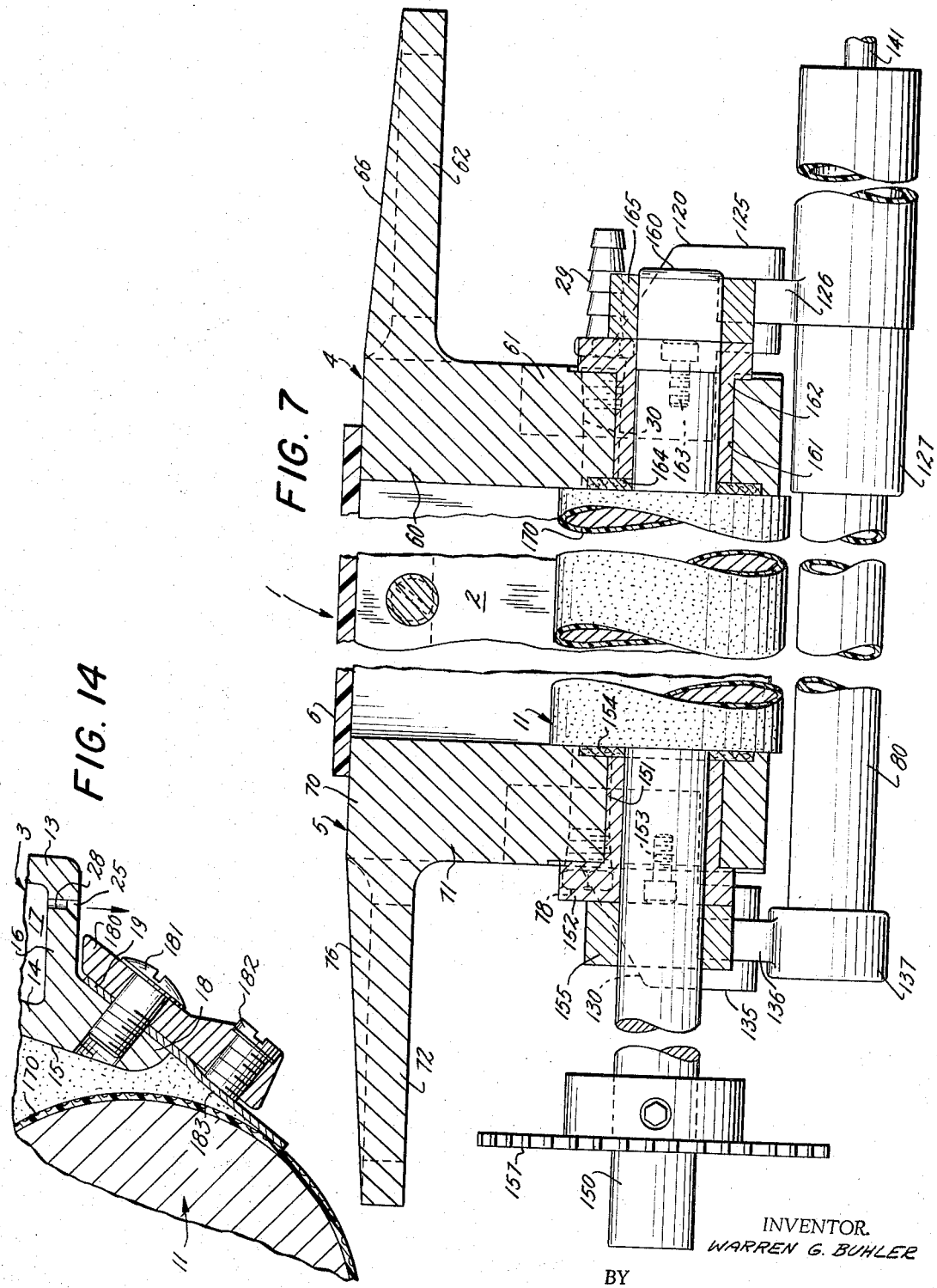

Dec. 13, 1966 W. G. BUHLER 3,292,046
POWDER SPRAYER WITH FLEXIBLE BLADES
Filed April 23, 1964 6 Sheets-Sheet 5
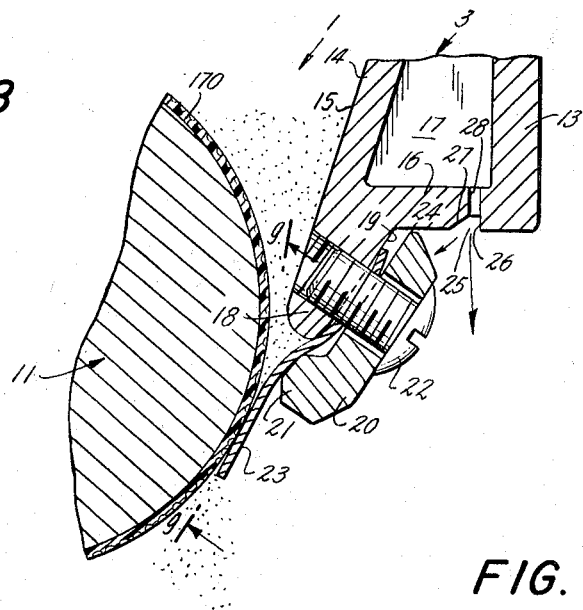
INVENTOR.
WARREN G. BUHLER
BY
Morgan, Finnegan, Durham & Pine
ATTORNEYS Dec. 13, 1966  W. G. BUHLER  3,292,046
POWDER SPRAYER WITH FLEXIBLE BLADES
Filed April 23, 1964  6 Sheets-Sheet 6

INVENTOR.
WARREN G. BUHLER
BY
Morgan, Finnegan, Durham & Pine
ATTORNEYS

United States Patent Office 3,292,046
Patented Dec. 13, 1966

3,292,046
POWDER SPRAYER WITH FLEXIBLE BLADES
Warren G. Buhler, Westfield, N.J., assignor to Oxy-Dry
 Sprayer Corporation, New York, N.Y., a body corporate of New York
Filed Apr. 23, 1964, Ser. No. 362,128
6 Claims. (Cl. 317—3)

This invention relates to powder sprayers, and more particularly, to powder sprayer units capable of laying down a substantially uniform layer of fine particle material upon a surface which is usually in the form of a moving web or sheet.

The prior electrostatic powder sprayers have usually included a powder box, a metering mechanism for dispensing the powder material at a uniform rate, and apparatus which provides an electrostatic field to free the powder particles from the metering mechanism and to disperse the particles so that they fall by gravity to the surface below providing a uniform powder layer. The metering mechanism usually comprises a dispensing roller and a tangential wiping blade. Typically, this tangential wiping blade is fairly rigid and relatively wide so that it can be disposed within the powder box and, in addition to performing the metering function, also provide an unobstructed sloping surface for funneling the powder toward the dispensing roller.

Although reasonable success has been achieved, there are nevertheless several disadvantages inherent in the prior structures. As a practical matter, it is virtually impossible to construct a perfectly straight wiping blade due to the molecular structure and stress patterns in the blade material. In order to obtain a reasonably straight blade, the blade would be creased longitudinally during fabrication. Thereafter, when the blade is installed, it is necessary to overcompensate by increasing the blade pressure against the roller sufficiently to insure that the wiping blade engages the dispensing roller throughout its entire length. The increased blade pressure increases the required driving torque for the roller and as a result requires a larger driving mechanism. Since the blade pressure cannot be controlled accurately throughout the length of the blade, variations in blade pressure could not effectively be used as a means for varying the powder dispensing rate. Also, it was very difficult to operate with relatively high roller speeds since it was difficult to maintain adequate blade pressure at all points along the roller engaging blade surface.

The fact that the wiping blades are pre-bent also creates a problem since it is necessary to carefully package the blades in rigid containers after fabrication so that the blades are not bent out of shape during storage and shipping. As a result, the packaging, storing and shipping expenses were substantial. The pre-bent rigid wiping blades were also found difficult to install on location and not readily adjustable to compensate for tolerances in the supporting structure or uneven wear. Furthermore, the fact that the wiping blades were disposed inside the powder box created numerous problems when attempting to replace a worn out blade.

An object of this invention is to provide a powder sprayer including a wiping blade arrangement which overcomes the disadvantages experienced with prior structures.

Another object is to provide a powder sprayer utilizing flexible wiping blades which are not pre-bent and which can therefore be rolled up when not in use to facilitate storing and handling and substantially reduce the required manufacturing accuracies.

Another object is to provide powder sprayers wherein the wiping blades are secured to the outside of the powder box so that the blades can easily be replaced without disassembling the sprayer unit or removing the sprayer unit from its normal installed position.

Another object is to provide a powder sprayer utilizing relatively narrow wiping blades which are easily adjustable to provide the desired blade pressure against the dispensing roller so that friction between the roller and the blade can be minimized and so that the proper metering action can be achieved throughout a relatively wide range of roller speeds.

Another object is to provide a powder sprayer wherein the wiping blade is easily adjustable with respect to the dispensing roller so that the pressure against the roller can be varied as desired to compensate for tolerances in the supporting structures and inaccuracies due to uneven wear.

Another object is to provide a powder sprayer wherein the wiping blades are easily adjustable to control the dispensing rate and to attain certain controlled uneven powder distributions when desired.

In addition to the powder box, dispensing roller, wiping blades, and electrostatic field generating apparatus, powder sprayers usually include a pneumatic structure for creating an air curtain on each side of the sprayer between the powder box and the surface below receiving the powder layer. This air curtain confines the powder material to the area below the roller and eliminates the effect of ambient air currents.

A further object of the invention is to provide an integral structure which both supports the wiping blades and provides an air curtain.

A still further object is to provide a pneumatic structure for creating a relatively uniform air curtain, which is located within the powder box but does not decrease the useful capacity of the powder box.

Another object is to provide a pneumatic structure having a relatively large plenum chamber which creates an air curtain which is substantially uniform over the entire length of the powder sprayer.

Still another object is to provide a pneumatic structure which provides a substantially uniform air curtain and which also prevents accumulation of powder on external portions of the sprayer unit.

The manner in which the foregoing and other objects are achieved is set forth more fully in the following specification which describes a few illustrative embodiments within the scope of this invention. The drawings form a part of this specification wherein:

FIG. 1 is a perspective view, with portions broken away, illustrating one end of the powder sprayer;

FIG. 2 is a perspective view illustrating the other end of the powder sprayer with the journal structure partially disassembled;

FIG. 3 is a plan view of the powder sprayer and associated driving mechanism;

FIG. 4 is a side view of the powder sprayer;

FIG. 7 is a longitudinal cross sectional view of the powder sprayer illustrating the journal structure and taken along line 7—7 as indicated in FIG. 3;

FIG. 8 is an enlarged partial cross sectional view of the structure shown in FIG. 6 illustrating the details of the wiping blade assembly;

FIG. 9 is an illustration of the roller surface in accordance with one embodiment of the invention as seen from line 9—9 in FIG. 8;

FIG. 10 is an illustration of an alternative surface structure for the roller as seen along line 9—9 in FIG. 8;

FIG. 11 is a cross sectional view illustrating the socket structure for retaining one end of a discharge tube;

FIG. 14 is a cross sectional view similar to FIG. 8 but illustrating an alternative wiping blade arrangement.

GENERAL DESCRIPTION

Figure 5:
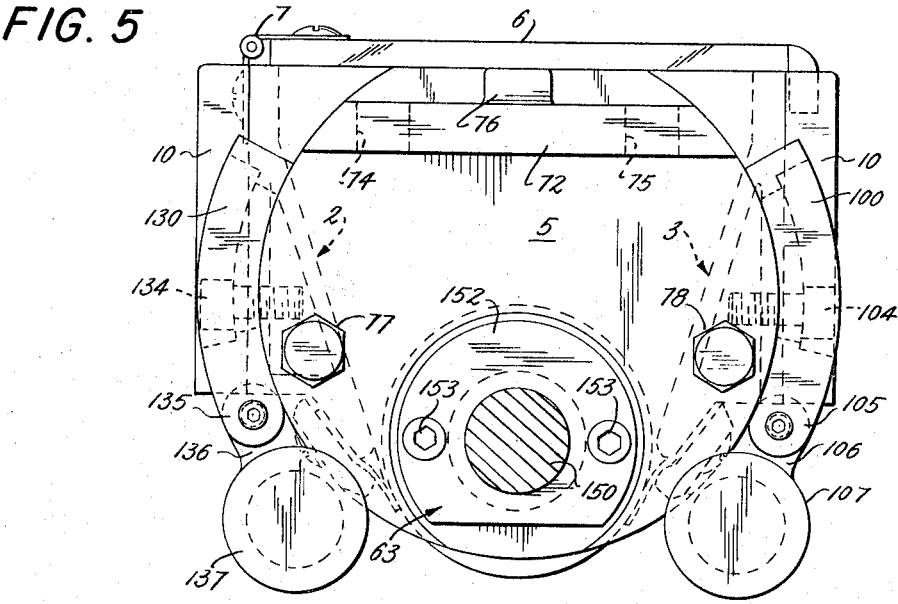
FIG. 5 is an end view of the powder sprayer taken along line 5—5 as indicated in FIG. 4.

The side panels for the powder sprayer in accordance with this invention are constructed having sloping inner surfaces which lie in planes generally tangential to the dispensing roller so that all of the powder or dusting materials within the powder box is funneled toward the roller. The outer surface of a side panel is vertical so that a triangular cavity is formed within the panel to provide a plenum chamber. A longitudinal V-shaped groove is machined into the lower horizontal portion of the side panel between the sloping and vertical surfaces. A plurality of holes are spaced along this groove so that when air pressure exists within the plenum chamber a large number of air jets are provided along the groove. Due to the groove, the jets fan out elliptically and inwardly to thereby provide a relatively uniform air curtain. The inwardly direction portion of these jets prevent accumulation of powder on the external surfaces of the wiper blade and associated supporting structure.

The wiping blade is relatively narrow and is constructed from a relatively thin strip of blue spring steel. Preferably, the wiping blade is coated with a fluorocarbon material. Thus, the wiping blade is flexible and therefore can easily be rolled up during storage and shipping.

The inwardly slanted surface of a side panel extends below the plenum chamber. This extended portion of the side panel is shaped to provide a retaining surface for the wiping blade. The wiping blade is secured between the retaining surface and a retaining strip by means of longitudinally spaced adjusting screws. The retaining strip is shaped so as to deform the flexible wiping blade transversely of the roller over the entire length of the blade or in other words, so that the wiping blade will take on a transverse S-shaped bend extending from one end of the blade to the other. As a result of this bend, the wiping blade becomes relatively rigid and substantially straight in the longitudinal direction. Since the blade is flexible, relatively narrow, and the securing structure is relatively close to the dispensing roller, the blade pressure against the roller can be accurately controlled by means of the adjusting screws.

POWDER BOX, WIPER BLADES AND AIR CURTAIN

First, referring to FIGS. 1-13 an advantageous embodiment of the invention is illustrated wherein the powder sprayer includes a powder box 1, defined by a pair of spaced apart side panels 2 and 3, end brackets 4 and 5 and a dispensing roller 11. The side panels are secured between the end brackets by means of two pairs of support blocks 9 and 10, these support blocks being formed as an integral portion of the end brackets. The side panels are secured to the support blocks by means of suitable screws as illustrated. A spacer member 12 is secured intermediate the ends of the side panels and is flush with the upper edge thereof. A lid 6 is secured to the upper edge of side panel 2 by means of an hinge 9 and is dimensioned to cover the top of the powder box and wrap over the upper edge of side panel 3 when in the closed position. Dispensing roller 11 is journaled in the end brackets and is disposed between the lower edges of side panels 2 and 3.

Figure 6:
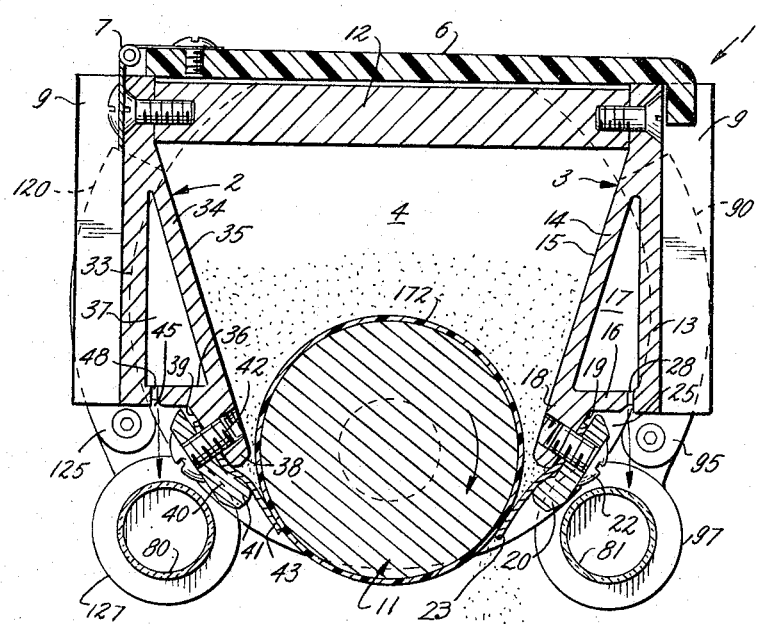
FIG. 6 is a cross sectional view of the powder sprayer taken along line 6—6 as indicated in FIG. 4.

The side panels, best seen in FIGS. 1, 6 and 8, are preferably integral extruded aluminum panels. Side panel 3 includes a vertical outer portion 14, a sloping portion 15 and a lower horizontal portion 16, which portions define a plenum chamber 17 having a generally triangular cross section and extending through the side panel from end to end. The sloping surface 15 lies in a plane tangential to dispensing roller 11 and meets vertical portion 13 somewhat below the upper edge of the side panel. Surface 15 extends beyond the horizontal portion 16 and forms one surface of a lower extended portion 18. The other flat surface of extended portion 18 is blade retaining surface 19 which lies in a plane which meets the plane of surface 15 at the point of tangency with the roller, or somewhat below the point of tangency. The plane dihedral angle between these planes is approximately 20 degrees. The lower edge of extended portion 18 is rounded as shown.

A longitudinal V-shaped groove 25, best seen in FIG. 8, is machined into the lower surface of horizontal portion 16. This groove forms an outer vertical groove surface 26 and inwardly sloping groove surface 27. Preferably, the groove is located directly below the outer portion of plenum chamber 17. A plurality of holes 28 are drilled through bottom portion 16 extending between the apex of groove 25 and plenum chamber 17.

When the side panel is secured in position, end bracket 4 seals off one end of plenum chamber 17, and end bracket 5 seals off the other end. Preferably, a sealing gasket is connected in position between the end brackets and the side panels. A hose connecting nipple 29 is threaded into a threaded bore 30 passing through end bracket 4 so as to communicate with plenum chamber 17. A suitable air pump can be coupled to the plenum chamber via an air hose (not shown) to create a pneumatic pressure within the chamber. As a result, a plurality of air jets are formed via holes 28. Because of groove 25, these jets tend to fan out elliptically and thus provide a relatively uniform air curtain extending between adjacent holes throughout the entire length of the side panel. Due to sloping groove surface 27, a portion of each of these jets is directed inwardly to prevent accumulation of powder on retaining member 20, adjusting screws 22 and wiping blade 23 located beneath the side panel.

Side panel 2 is identical to side panel 3 and includes components 33–49 corresponding, respectively, to components 13–29 of side panel 3. As shown in FIG. 6, the powder material to be dispensed is placed in the powder box between sloping surfaces 15 and 35 and above dispensing roller 11. Thus, the sloping surfaces serve to funnel the powder downwardly toward the dispensing roller. It should be noted that the plenum chambers are therefore located in an area which would otherwise be wasted space. Plenum chambers 17 and 37 are sufficiently large so that the air pressure therein is substantially uniform over the entire length of the side panels.

Wiping blades 23 and 43 are each constructed from a thin, flexible strip of blue spring steel and are preferably coated with a fluorocarbon material. These blades are approximately one inch wide and have a length equal to the length of the side panels 2 and 3. Holes are drilled through the blade near the upper edge and are spaced on tow inch centers.

Semi-rigid retaining member 20, best seen in FIG. 8, is preferably an extruded aluminum strip equal in length to wiping blade 23 and side panel 3. Longitudinally spaced holes are drilled through retaining member 20 corresponding in position to the holes in blade 23, and corresponding tapped holes are drilled into extended portion 18 of side panel 3, these holes being normal to blade retaining surface 19. Wiping blade 23 is positioned between extended portion 18 of the side panel and retaining member 20, and this assembly is secured by means of suitable round head adjusting screws 22. Preferably, the holes in the wiping blade, retaining member and extended portion of the side panel are accurately aligned so that the wiping blade can easily be replaced.

Retaining member 20 includes a flat blade engaging surface which curves into an inwardly extending rib 21 at the lower edge thereof. The distance between screw 22 and rib 21 must be greater than the distance between screw 22 and the lower edge of extended portion 18. The distance between screw 22 and the upper edge 24 of the retaining member is preferably somewhat greater than the distance along surface 19 between screw 22 and the lower surface of bottom portion 16. Thus, when screw 22 is tightened, moving retaining member 20 toward retaining surface 19, the upper edge 24 strikes the lower surface of bottom portion 16. Thereafter, when screw 22 is further tightened, retaining member 24 pivots about edge 20 and applies pressure along the longitudinal center line of blade 23 via rib 21. As a result, the blade is bent inwardly by rib 21 along the center line of the wiping blade which is located between extended portion 18 and line of tangency on roller 11. Thus, the wiping blade is laterally deformed and takes on an S-shaped bend as shown in FIG. 8. In this manner, the flexible blade becomes rigid and substantially straight in the longitudinal direction. Each of the screws 22 are separately adjustable, and hence, the pressure applied by the wiping blade against dispensing roller 11 can be adjusted as desired at selected points along the blade. This permits adjustments to compensate for uneven wear or for tolerances in the dispensing roller surface or the side panel. Also, it is possible to adjust the blade so that greater pressure is exerted against the dispensing roller in selected areas to thereby obtain a non-uniform dispensing rate when desired.

END BRACKETS AND DISCHARGE TUBE MOUNTING STRUCTURE

End brackets 4 and 5 are identical to one another and are secured abutting the ends of side panels 2 and 3 by means of support blocks 9 and 10 respectively which form integral portions of the end brackets. The end brackets thus serve as closure members for the ends of the powder box and the ends of the plenum chambers within the side panels. Also, the end brackets support bearings for the journals for dispensing roller 11, arcuate surfaces for cooperating with the discharge tube supporting structure, and bracket portions for securing the powder sprayer to associated apparatus or a suitable support frame structure.

Figure 12:
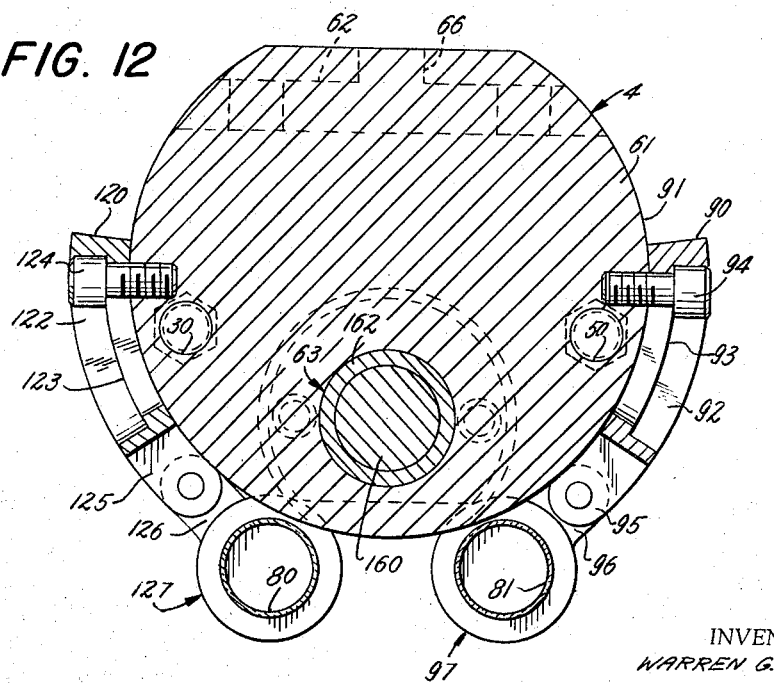

End bracket 4 is an integral structure including an end closure member 60, a substantial circular boss 61 extending horizontally away from the surface of closure member, and a support leg 62 extending horizontally from the flat surface of the boss. The diameter of circular boss 61 is approximately equal to the distance between the outer surfaces of side walls 2 and 3. Boss 61 is positioned to accommodate an off-center journal housing 63 for discharge roller 11, the discharge roller being located as shown in FIG. 12. The lower portion of closure member 60, i.e., the portion lying below the horizontal center line of boss 61, is curved and conforms to the circular configuration of the boss. Support blocks 9 are secured to the edges of closure member 60 and extend in the direction of the side panels. Support blocks 9 are spaced apart so that they will lie on the outer surfaces of the side panels when the end bracket is secured in position. The upper edges of closure member 60 and boss 61 are flush with the upper edges of side panels 2 and 3.

Support leg 62 can have any desired configuration and includes a pair of slots 64 and 65 therein extending through the support leg from top to bottom. As shown in FIG. 7, support leg 62 is positioned slightly below the upper surface of boss 61 and is strengthened by means of a tapered rib 66 extending from boss 61 along the upper surface of the support leg. The support leg can be either horizontal as shown, or can be vertical to facilitate side mounting.

End support bracket 5 is an integral structure identical to end support bracket 4 and includes an end closure member 70, a substantially circular boss 71, a pair of spaced-apart support blocks 10, and a support leg 72 with an associated strengthening rib 76 and slots 74 and 75. Thus, when the end brackets are secured in the positions as shown in FIGS. 1 and 2, the brackets close the ends of the powder box and also close the ends of the plenum chambers within the side panels. Preferably, a sealing gasket is cemented in position between the end brackets and the ends of the side panels. As previously mentioned, a pair of bores 30 and 50 are provided extending through end bracket 4 and are each positioned to communicate with a different one of the plenum chambers 17 and 37 respectively. The threaded bores are adapted to accommodate threaded hose connecting nipples 29 and 39 respectively. End bracket 5 likewise includes a pair of threaded bores so that this end bracket will be identical to end bracket 4. The threaded bores in end bracket 5, however, are not used and are therefore sealed by means of suitable threaded plugs 77 and 78. The assembled powder sprayer can be positioned as desired by means of suitable bracket members (not shown) bolted to support legs 62 and 72 or by bolting the support legs directly to a suitable supporting structure.

Discharge tubes 80 and 81 are similarly constructed and each includes a cylindrical glass tube which is evacuated and then filled with an inert gas such as argon. The glass tubes are slightly longer than the side panels and are internally coated with a suitable phosphorous material. The discharge tubes include a cathode at one end only. As shown in FIG. 11, the cathode end of the discharge tube includes a cup shaped cathode member 82 connected to a conductive metallic end cap 83 by means of a suitable support conductor 84.

It is desirable that the discharge tubes be positioned generally parallel to dispensing roller 11 and that they be adjustable in position with respect to the roller. Also, it is desirable that the tubes be detachably secured so that they can easily be replaced.

The discharge tube support structure for tube 81 includes a support arm 90 having an arcuate inner surface with the same radius of curvature as the arcuate surface 91 at the periphery of boss 61. Thus, the inner surface of support arm 90 is adapted to engage arcuate surface 91 as shown in FIG. 1, and is adjustable with respect to the boss. Support arm 90 includes an elongated locking slot 92 including an elongtaed annular shoulder 93 (best seen in FIGS. 12 and 13) which is concentric with the arcuate surface of boss 61. A tapped hole is bored into boss 61 along the horizontal center line and is dimensioned to accommodate a socket type cap screw 94 which passes through slot 92. Thus, when cap screw 94 is loosely placed in position, support arm 90 can slide from an upper position as shown in FIG. 12 to a lower position shown in FIG. 13. It should be noted that arcuate surface 91 is eccentric with respect to the dispensing roller surface due to the off-center location of the journal housing with respect to boss 61. Support arm 60 can be rigidly secure at any position by tightening cap screw 94 so that the head of the screw engages shoulder 93 of the locking slot.

Figure 13:
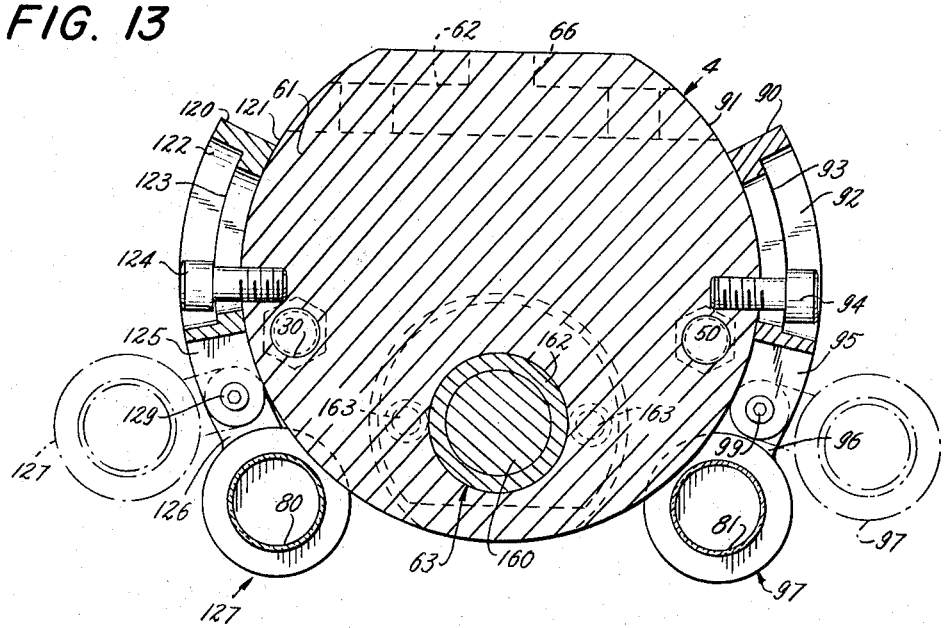
FIGS. 12 and 13 are cross sectional views of one of the end brackets taken along line 12—12 in FIG. 4 and illustrating the adjustable discharge tube support structure.

The lower portion of support arm 90 (as viewed in FIG. 1) is offset and is constructed to provide a bifurcated end portion 95 dimensioned to accommodate a tab 96 extending from a spring biased tube socket 97. As shown in FIG. 11, a pair of axially aligned threaded apertures pass through the leg portions of bifurcated end 95 and a smaller diameter, axially aligned, aperture passes through tab 96. A pair of socket type, headless, set screws 98 and 99 are threaded into the leg portions of bifurcated end 95 so that the dog point ends of the set screws reside within the aperture passing through tab 96. In this manner, socket 97 is pivotably secured to support arm 90 (as illustrated in FIG. 13) and can be rigidly maintained in any desired pivoted position by appropriate adjustment of set screws 98 and 99.

A support arm 100, which is a mirror image of support arm 90, is adapted to engage the arcuate surface 101 located at the periphery of boss 71 of end bracket 5. Support arm 100 is secured to end bracket 5 by means of a cap screw 104 which passes through an elongated locking slot 102 and engages shoulder 103 within the slot. A tab 106 extending from a cup shaped tube socket 107 is pivotably secured to support arm 100 by means of an offset bifurcated end portion 105. Tube socket 107 is preferably constructed from a material having a high electrical resistance and is dimensioned internally to accommodate the end of electrostatic tube 81.

Spring biased socket 97 includes a generally cylindrical outer housing 110 which is partially closed at one end. An insulated conductor 111 passes through the partially closed end of housing 110 and through the center of a retaining washer 112. The free end of the conductor is imbedded in a globule or bead of solder 113 to provide a relatively large conductive surface and to prevent conductor 111 from pulling out of the washer. A spring 114 is disposed between retaining washer 112 and the partially closed end portion of housing 110 to urge the retaining washer away from the partially closed end of the housing. As previously mentioned, tab 96, which extends radially from housing 110, is pivotably secured by the bifurcated end portion of support arm 90. Housing 110 is preferably an integral structure constructed from a material having a high electrical resistance.

Conductor 111 after emerging from the end of socket 97, is connected to one end of a high voltage secondary winding 115 of a transformer 116, the other end of the secondary winding being connected to a suitable ground, which may be the side panels of the powder sprayer or a ground surface located at some point below the sprayer. Primary winding 117 of transformer 116 is connected to a suitable 60 cycle alternating current source. Transformer 116 is preferably constructed to provide approximately 10,000 volts to electrode 82 via conductor 111.

Discharge tube 81 is installed by inserting the electrode end into spring biased socket 97 thereby compressing spring 114. The other end of the discharge tube is then inserted into socket 107, and when released, is retained in socket 107 by virtue of the force extended by spring 114. Thereafter, discharge tube 81 can easily be adjusted to any desired position parallel to dispensing roller 11 by means of the pivotable connection between the sockets and support arms 90 and 100, or by adjusting the position of the support arms relative to end brackets 4 and 5.

The adjustable support structure for discharge tube 80 is essentially the same as the supporting structure for discharge tube 81, except that it is attached to position tube 80 on the opposite side of dispensing roller 11. The components comprising the adjustable supporting structure for discharge tube 80 are designated with reference numerals 120–144 corresponding respectively to reference numerals 90–114. Conductor 141 emerging from socket 127 is also connected to the ungrounded end of secondary winding 115 (FIG. 11).

ROLLER ASSEMBLY

Roller 11 can be a solid steel roller with longitudinal extending shafts as shown in the drawings, or can include a hollow cylindrical roller with suitable roller gudgeons secured to the ends to form the longitudinal extending shaft portions. The length of the roller portion is slightly less than the distance between end brackets 4 and 5 as determined by the length of the side panels.

Journal shaft 150, extending from one end of roller 11, passes through a journal opening 151 in end bracket 5 forming part of journal housing 73, and through a flanged bearing 152 constructed from a suitable bearing material, preferably a fluoro-carbon material. Journal opening 151 is dimensioned to accommodate flanged bearing 152 and includes an annular recess dimensioned to seat the flange of the bearing. As shown in FIG. 2, flanged bearing 152 is slid into position from outside end bracket 5 and is thereafter secured to the end bracket by means of set screws 153 passing through the flange of the bearing. An annular recess is also provided on the inner side of end bracket 5 surrounding journal opening 151, to accommodate a felt washer 154 which provides a journal seal and prevents powder from entering the bearing structure. A collar 155 is slid over the end of shaft 150 and is rigidly secured to the shaft by means of a set screw 156. This collar is positioned adjacent bearing 152 and prevents longitudinal movement of the roller with respect to the end bracket. A sprocket gear 157 is secured near the end of shaft 150 by means of a suitable set screw passing through the hub of the gear. As shown in FIG. 3, a chain 158 couples sprocket gear 157 to an associated sprocket gear mounted on the shaft of an electric motor 159. Motor 159 is preferably of a variable speed drive type capable of rotating roller 11 at speeds ranging from small fractions of one r.p.m. to fifty r.p.m.

Journal 63 in end bracket 4 is similar to journal 73 previously described and includes a flanged bearing 162 secured in a journal opening 161 by means of set screws 163 so that the bearing surrounds shaft 160 extending longitudinally from the end of roller 11. A felt sealing washer 164 is provided surrounding the shaft on the inner side of end bracket 4, and a collar 165 is secured to shaft 160 adjacent bearing 162 by means of set screw 166.

The cylindrical surface 170 of roller 11 is advantageously coated with a fluorocarbon material and thereafter further processed to provide a powder receptive surface. The processed surface of the roller is illustrated in a magnified view of the roller surface shown in FIG. 9 and includes an almost infinite number of small powder carrying cavities. As illustrated in FIG. 8, the powder material in powder box 1 is fed by gravity into the area between roller 11 and wiping blade 23. As the roller rotates, a thin layer of powder wedges passed the wiping blade. The thickness of the powder layer, and hence, the quantity of powder dispensed, depends on the adjustment of screws 22 which in turn determines the blade pressure against the roller. The minimum rate at which powder can be dispensed is determined by the capacity of the powder carrying cavities and the minimum rotation speed of the dispensing roller. The dispensing rate can be increased by either increasing the rotation speed of the roller or by decreasing the blade pressure against the surface of the dispensing roller.

An alternative surface structure for the dispensing roller is illustrated in FIG. 10 where the cylindrical surface is engraved to present a uniform waffle-like pattern. This structure increases the capacity of the powder carrying cavities which is desirable where high dispensing rates are required or large powder particles are being dispensed. Preferably, the engraved dispensing roller is coated with a fluorocarbon material. With the dispensing roller surface shown in FIG. 10, the dispensing rate can also be varied by adjusting the speed of rotation for the dispensing roller and the wiping blade pressure.

Although it has been mentioned that the dispensing rate for a given roller surface can be adjusted by varying the roller speed and blade pressure, there is a practical limit ot these adjustments since eventually the powder will begin to sift, that is, the powder will begin to come through in uneven chunks resulting in an uneven and relatively uncontrolled powder distribution. The maximum dispensing rate for a particular roller varies in accordance with the type of powder being dispensed. When a particular roller does not achieve the desired dispensing rate, the roller is replaced with another roller having larger powder carrying cavaties.

It is significant that the roller and the wiping blades are coated with a fluorocarbon material and that the roller bearings are likewise constructed from a fluorocarbon material. The fluorocarbon material used for coating the roller and wiping blades is preferably the polymer of trifluorochlorenthylene commercially marketed under the tradename Kel-F and characterized by the formula (CF$_2$—CFCl)x. First these materials exhibit a high chemical resistance so that other materials, such as the powder being dispensed, cannot readily adhere to the roller and wiping blade surfaces. Second, fluorocarbon materials have substantially a zero moisture absorption characteristic and therefore reduced the possibility of moisture contamination of the powder being dispensed. Third, these materials have a relatively high compression strength and hence, excellent wear characteristics. This is significant in the bearings, and also with respect to the roller and wiping blade arrangement which is subjected to the constant rubbing action as the powder material, which may be abrasive, passes between the roller and wiping blade. Further, fluorocarbon materials have a high electric resistance and high resistance to electrostatic charges. It should be noted that the steel roller, due to the flanged fluorocarbon bearing and fluorocarbon coating is electrically isolated and hence, is electrically insulated from the electrostatic field. If the dispensing roller were not isolated, there would be some electric charge, from the electrostatic field created by discharge tubes 80 and 81, which would be carried into the powder box by means of the roller and thereby electrostatically contaminate the powder material. This electrostatic contamination would adversely effect the dispensing of the powder material.

ASSEMBLY AND OPERATION

The powder sprayer in accordance with this invention is of a generally symmetrical design so as to minimize the number of different components. The side panel and wiping blade assembly on one side of the roller is identical to the side panel and wiping blade assembly on the other side. The end brackets are identical to one another, and the two discharge tubes supporting structures are also substantially identical. This symmetrical construction is also advantageous since the dispensing roller can be rotated in either direction and the entire unit can be installed with either side panel facing outwardly.

The powder sprayer is installed with the dispensing roller positioned horizontally, usually less than a foot above the surface to be coated with the powder material. Usually, the powder receiving surface is in the form of a moving web or sheet.

The powder or dusting material to be dispensed is either placed directly in the powder box above dispensing roller 11 or is supplied by a suitable feed mechanism. Thereafter, the drive motor is energized to rotate motor 11. The roller, if rotating in a clockwise direction, forces powder past wiping blade 23, in which case wiping blade 43 acts as a seal between the side panel and the other side of the roller. On the other hand, if the dispensing roller rotates in a counter clockwise direction, wiping blade 43 provides the metering function and wiping blade 23 acts as the seal. In either event, the powder material is metered out at a uniform rate. Thereafter, the force of gravity and the force created by the electrostatic field provided by the discharge tubes, strips the roller clean so that the powder material falls to the surface below.

When discharge tubes 80 and 81 are energized, potential gradients are created surrounding the tubes which in turn ionize some of the air molecules in the vicinity of the discharge tube. This effect is known as corona. The ionized particles having the same polarity as that appearing in the surface of the discharge tube stream away from the discharge tubes creating air currents referred to as electronic winds. These electronic winds are in a generally downward direction in the area beneath dispensing roller 11. The downwardly directed electronic wind and the electrostatic attraction of the power particles assist the forces of gravity in removing the particles from the roller. A large number of the released particles become charged with the same polarity as the surrounding air molecules. This effect creates a powder cloud beneath the dispensing roller and brings about a more uniform dispersion of powder particles than could otherwise be achieved.

As previously mentioned, the dispensing rate is determined by the rotational speed of dispensing roller 11, and the blade pressure against the dispensing roller surface. It should be noted that the wiping blade is relatively narrow and that the retaining member, which controls the blade pressure, is relatively close to the dispensing roller. With this arrangement the blade pressure can be controlled with considerable accuracy. Furthermore, since the adjusting screws are individually adjustable, the blade pressure can be adjusted separately in different selected areas.

After the powder sprayer unit is placed in operation, the powder distribution is observed and the roller speed and blade pressure are adjusted until a desired dispensing rate is achieved. If the powder distribution is uneven, as may be caused by inaccuracies in the dispensing roller or side panels or by uneven wear, this is easily corrected by adjusting the blade pressure in appropriate selected areas. In cases where a particular uneven distribution is desired, for example, more powder in the center than at the ends, such uneven distribution can be attained by adjusting the blade pressure so that it is greater at the ends than at the center.

The position of the discharge tubes can be adjusted so that one or both of the tubes are effective, and hence, the effective strength of the electrostatic field can be varied over a relatively wide range. Also, the tube position can be adjusted to provide an electrostatic field which is non-symmetrical and which thus tends to propel powder particles in other than a directly downward direction. The non-symmetrical field can be used, for example, to compensate for the effect of ambient air curtains on the powder particles as they fall from the dispensing roller to the surface below.

When the unit is placed in operation, a pneumatic pressure is created in the plenum chambers by means of a suitable air pump to thereby create an air curtain on each side of the roller. These air curtains extend between the side panels and the surface below and thereby protect the enclosed area from ambient air currents.

ALTERNATIVE BLADE ARRANGEMENT

Another arrangement for positioning a flexible wiping blade tangential to the dispensing roller is shown in FIG. 14. Roller 11 and side panel 3 as shown in FIG. 14 are the same as those previously described.

The flexible wiping blade is preferably constructed from blue spring steel and coated with a fluorocarbon material. The wiping blade is rigidly secured between retaining surface 19 of the side panel and a rigid retaining strip 100. The retaining strip is securely fastened to the side panel by means of screws 181 which pass through the retaining member and the blade and which are then threaded into extending portion 18 of the side panel.

Retaining strip 180 extends beyond the lower surface of extended portion 18. A large number of adjusting screws 182 are spaced along strip 180. These screws pass through the retaining strip and extend beyond the retaining strip so that they engage wiping blade 183 in the area between the areas engaging the dispensing roller and the retaining surface. Screws 182 are extended so that the wiping blade becomes laterally deformed taking on an S-shaped bend. Adjustment of screws 182 controls the blade pressure against the dispensing roller.

Although only a few illustrative embodiments of the invention have been described in detail, it should be obvious to persons skilled in the art that there are numerous additional variations and embodiments within the scope of this invention. The invention is more particularly defined in the appended claims.

What is claimed is:

1. In an electrostatic powder sprayer, the combination of
a pair of spaced apart end members;
a cylindrical dispensing roller journaled between said end members;
receptacle means located between said end members and above said roller providing a receptacle for powder materials to be dispensed;
means attached to said receptacle means for providing a retaining surface near said roller and parallel to the axis thereof;
at least one wiping blade disposed to engage said retaining surface and to tangentially engage said dispensing roller, the combination of said dispensing roller and said blade providing a metering mechanism for dispensing powder material from said receptacle;
first blade deforming means contacting that portion of said blade between said retaining surface and said dispensing roller and urging said blade toward said roller to provide a first curvature of said blade extending uniformly over the length of said blade;
second blade deforming means contacting that portion of said blade extending beyond said retaining surface prior to deformation and urging said portion of the blade toward said roller to provide a second curvature extending uniformly over the length of said blade;
said first and second curvatures creating a transverse S-shaped bend extending over the length of said blade to provide rigidity of the blade and resilient engagement with said roller.

2. A power sprayer in accordance with claim 1 wherein said first and second deforming means are both part of a rigid blade deforming member movable toward said retaining surface to curve said blade around a portion of said retaining surface and to urge said blade beyond the point of mere engagement with said roller to thereby create said S-shaped bend.

3. A powder sprayer in accordance with claim 2 further comprising a plurality of adjusting screws spaced apart along the length of said blade deforming member, each of said screws passing through said deforming member and said blade and threaded into said retaining surface for adjustably urging said deforming member toward said roller.

4. In an electrostatic powder sprayer, the combination of
a pair of spaced apart end members;
means located between said end members defining a receptacle for powder materials;
a metering mechanism communicating with said receptacle for dispensing the powder material at a substantially uniform rate, including
a cylindrical dispensing roller journaled between said end members within an opening beneath said receptacle, and
at least one wiping blade tangentially engaging said roller;
means secured to said receptacle to provide a retaining surface extending parallel to the axis of said roller, said blade being disposed to also engage said retaining surface so that said retaining surface and said roller provide rigid support on one side of said blade in two spaced apart areas;
deforming means on the other side of said blade initially contacting said blade in areas straddling the area of initial contact with said retaining surface;
means urging said deforming means toward said dispensing roller to create a transverse compound bend extending throughout the length of said blade; and
means for creating an electrostatic field in the vicinity of said dispensing roller.

5. Apparatus in accordance with claim 1 wherein said dispensing roller is provided with powder carrying cavities.

6. Apparatus in accordance with claim 4 wherein said means defining said receptacle includes a pair of spaced apart side panels secured between said end members parallel to the axis of said roller, said side panels each having sloping inner surfaces generally tangential to said dispensing roller and at least one of said side panels being shaped to provide said retaining surface.

References Cited by the Examiner

UNITED STATES PATENTS

| | | | |
|---|---|---|---|
| 1,986,047 | 1/1935 | Dawley et al. | 118—323 X |
| 2,027,307 | 1/1936 | Schacht | 117—17 X |
| 2,027,308 | 1/1936 | Schacht | 117—17 X |
| 2,394,657 | 2/1946 | Beregh | 95—1.7 X |
| 2,972,332 | 2/1961 | Limberger | 95—1.7 X |
| 3,114,482 | 12/1963 | Dunaway | 222—328 X |
| 3,221,938 | 12/1965 | Yonkers et al. | 317—2 X |

MILTON O. HIRSHFIELD, *Primary Examiner.*

SAMUEL BERNSTEIN, *Examiner.*

J. A. SILVERMAN, *Assistant Examiner.*